(12) United States Patent
Caruel et al.

(10) Patent No.: US 11,767,808 B2
(45) Date of Patent: Sep. 26, 2023

(54) REAR ASSEMBLY OF AN AIRCRAFT TURBOJET ENGINE NACELLE COMPRISING A THRUST REVERSER WITH SLIDING CASCADES

(71) Applicant: Safran Nacelles, Gonfreville l'Orcher (FR)

(72) Inventors: Pierre Caruel, Moissy Cramayel (FR); Loïc Grall, Gonfreville l'Orcher (FR); Alexis Heau, Gonfreville l'Orcher (FR); Olivier Kerbler, Gonfreville l'Orcher (FR); Mélody Seriset, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 111 days.

(21) Appl. No.: 16/933,179

(22) Filed: Jul. 20, 2020

(65) Prior Publication Data
US 2020/0347801 A1 Nov. 5, 2020

Related U.S. Application Data

(63) Continuation of application No. PCT/FR2019/050105, filed on Jan. 18, 2019.

(30) Foreign Application Priority Data

Jan. 18, 2018 (FR) ..................... 18/50403

(51) Int. Cl.
*F02K 1/72* (2006.01)
*F02K 1/76* (2006.01)
(Continued)

(52) U.S. Cl.
CPC ................ *F02K 1/72* (2013.01); *F02K 1/763* (2013.01); *B64D 29/06* (2013.01); *F02K 3/06* (2013.01);
(Continued)

(58) Field of Classification Search
CPC ... F02K 1/70; F02K 1/72; F02K 1/763; B64D 29/06; F05D 2240/129
See application file for complete search history.

(56) References Cited

U.S. PATENT DOCUMENTS

2012/0285138 A1* 11/2012 Todorovic ................ F02C 7/14
60/230
2013/0025259 A1* 1/2013 Beardsley ............... F02K 3/075
60/226.2
(Continued)

FOREIGN PATENT DOCUMENTS

FR 2952681 5/2011
FR 2999239 6/2014

OTHER PUBLICATIONS

International Search Report for international patent application PCT/FR2019/050105, dated May 2, 2019.

*Primary Examiner* — Andrew H Nguyen

(57) ABSTRACT

A nacelle rear assembly of a nacelle of a turbojet engine of an aircraft extends along a longitudinal central axis (A) and includes a sliding cascade thrust reverser. The cascade thrust reverser includes at least one sliding cowl, a deflection cascade including a plurality of rows of vanes that each extend around the longitudinal central axis (A) and that are longitudinally arranged from a first front row of vanes up to a last rear row of vanes, each row of vanes including at least one deflection vane for deflecting the airflow toward the outside of the rear assembly of the nacelle, the deflection cascade being movably integral with the sliding cowl, wherein the deflection cascade includes at least one additional neutral row of vanes that is interposed between the last row of vanes and the sliding cowl and that includes at least one neutral vane.

14 Claims, 2 Drawing Sheets

(51) Int. Cl.
*B64D 29/06* (2006.01)
*F02K 3/06* (2006.01)
(52) U.S. Cl.
CPC .. *F05D 2220/323* (2013.01); *F05D 2240/129* (2013.01)

(56) References Cited

U.S. PATENT DOCUMENTS

| | | |
|---|---|---|
| 2013/0092755 A1 | 4/2013 | Aten et al. |
| 2016/0131079 A1* | 5/2016 | Todorovic ............... F02K 1/763 239/265.19 |
| 2016/0222917 A1* | 8/2016 | Segat ..................... B64D 33/06 |
| 2016/0245180 A1 | 8/2016 | Todorovic et al. |
| 2016/0245230 A1* | 8/2016 | Todorovic ................. F02K 1/09 |
| 2018/0087474 A1* | 3/2018 | Chuck ........................ F02K 1/70 |
| 2018/0283179 A1* | 10/2018 | Gonzalez-Gutierrerz ................... F01D 5/16 |

* cited by examiner

REAR ASSEMBLY OF AN AIRCRAFT TURBOJET ENGINE NACELLE COMPRISING A THRUST REVERSER WITH SLIDING CASCADES

CROSS-REFERENCE TO RELATED APPLICATIONS

This application is a continuation of International Application No. PCT/FR2019/050105, filed on Jan. 18, 2019, which claims priority to and the benefit of FR 18/50403 filed on Jan. 18, 2018. The disclosures of the above applications are incorporated herein by reference.

FIELD

The present disclosure relates to the field of nacelles for aircraft engines and, more specifically to a rear assembly of an aircraft turbojet engine nacelle which comprises a thrust reverser with sliding cascades.

BACKGROUND

The statements in this section merely provide background information related to the present disclosure and may not constitute prior art.

An aircraft is generally moved by several turbojet engines each housed in a nacelle accommodating a set of auxiliary actuating devices linked to its operation and providing various functions when the turbojet engine is in operation or at stop.

These auxiliary actuating devices comprise in particular a thrust reverser device.

A turbojet engine nacelle generally has a substantially tubular structure comprising an air inlet upstream of the turbojet engine, a median section intended to surround a fan of the turbojet engine, a downstream section intended to surround the combustion chamber of the turbojet engine and possibly incorporating a thrust reversal means, and is generally terminated by an ejection nozzle whose outlet is located downstream of the turbojet engine.

Modern nacelles are intended to accommodate a bypass turbojet engine capable of generating via the blades of the rotating fan, a hot air flow (primary flow) and a cold air flow (secondary flow) which circulates outside the turbojet engine through an annular passage, also called a flow path, formed between a fairing of the turbojet engine and an inner wall of the nacelle. The two air flows are ejected from the turbojet engine by the rear of the nacelle.

The role of a thrust reverser is, during landing of an aircraft, to improve the braking capacity thereof by redirecting forward at least a portion of the air ejected from the turbojet engine. In this phase, the thrust reverser obstructs at least one portion of the flow path of the cold air flow and directs this flow forward of the nacelle, thereby generating a counter-thrust in addition to the braking of the aircraft wheels and air brakes.

Generally, the structure of a thrust reverser comprises a cowl which is mounted movable in longitudinal translation from front to back in a direction substantially parallel to the axis of the nacelle, between a closing position in which the cowl provides aerodynamic continuity of the nacelle, and an open position in which the cowl opens a passage in the nacelle.

In the case of a thrust reverser with cascade vanes, the reorientation of the air flow is carried out by cascade vanes, associated with reversing flaps which at least partially block the air circulation flow path, the cowl having only a simple slide function aiming at uncovering or covering these cascade vanes.

Nacelles called O-shaped structure nacelles, known under the terminology "O-Duct" are known, which have a downstream structure having a unique substantially peripheral structure extending from one side of the engine pylon to the other side.

It follows that such a structure generally has a single substantially peripheral cowl which, at the end of maintenance, is opened by downstream translation along the longitudinal axis of the nacelle.

For a detailed description, reference may be made to documents FR 2 911 372 and FR 2 952 681.

Moreover, the nacelles with an O-shaped structure include cascade vanes which are mounted movable in translation and configured to be retracted at least partially in the thickness of the median section of the nacelle and thus overlap the casing fan when the thrust reverser is inactive, in the direct jet position. In the thrust reversal position, the cascade vanes are displaced with the sliding cowl.

Each cascade vane comprises a plurality of blading rows which each extend about the longitudinal axis of the nacelle and which are arranged longitudinally from a first front blading row to a last rear blading row.

Each blading row includes a plurality of air flow deflection blades.

When the thrust reverser occupies its direct jet position, a front portion of the sliding cowl is in longitudinal bearing on the deflection edge of the fan casing via a seal, to inhibit the air circulating in the cold air flow path to enter the cavity that houses the cascade vanes.

A loss of tightness can occur for example when one or more sectors of the seal between the deflection edge and the rear cowl are damaged, such a loss of tightness can form a pressure pocket in the cavity which houses the cascade vanes.

The pressure pocket exerts pressure on the sliding cowl, which can cause the sensitive sliding cowl to move backward from its direct jet position, depending on the flexibility of the cowl.

Similarly, the sliding cowl can undergo an untimely backward movement when one or more locks for holding the sliding cowl in the closed position are not functioning properly.

As can be seen in FIG. 1, in the case of a backward movement of the sliding cowl, air rushes into the cavity then exits outward through the clearance that exists between the fan cowl and the sliding cowl.

This leakage air exerts on the blades of the cascade vanes an axial force likely to cause an additional backward movement of the assembly formed by the sliding cowl and the cascades, and to increase the air flow mentioned above, and to drive at unacceptable levels of effort.

SUMMARY

This section provides a general summary of the disclosure and is not a comprehensive disclosure of its full scope or all of its features.

The present disclosure provides a rear assembly of an aircraft turbojet engine nacelle, the nacelle rear assembly extending along a longitudinal central axis and the nacelle rear assembly including a thrust reverser with sliding cascades which comprises at least one sliding cowl which is axially mounted movable in longitudinal translation from front to back, between a closing position in which the sliding cowl provides aerodynamic continuity of the nacelle, and an opening position in which the sliding cowl opens a passage for the redirection of an air flow coming from a cold air flow path of the nacelle, and one cascade vane comprising a plurality of blading rows which each extend about the central axis and which are arranged longitudinally from a first front blading row to a last rear blading row, each blading row including at least one blade for deflecting the air flow toward the outside of the rear assembly of the nacelle, the cascade vane being secured in displacement to the sliding cowl. The cascade vane includes at least one additional neutral blading row which is interposed between the last blading row and the sliding cowl and which includes at least one neutral blade, the neutral blading row delimiting a leakage passage toward the outside of the rear assembly of the nacelle which is designed so that the force exerted on the neutral blade by the air through the leakage passage is devoid of an axial component oriented backward.

Thus, in the case of a significant backward movement of the sliding cowl, the nacelle rear assembly according to the present disclosure makes it possible to avoid the appearance of an overpressure air pocket which would push the sliding cowl backward.

Also, the neutral blading row allows the passage of a leakage air flow without this leakage air flow participating in exerting an axial backward movement force on the assembly formed by the cascade vane and the sliding cowl.

According to another form of the present disclosure, the leakage passage is adapted to direct the air perpendicular to the central axis of the rear assembly of the nacelle, or backward.

This form of the present disclosure aims to make zero the axial component of the force applied to the cascade by the leakage air flow, or to make this axial component positive so that the leakage air flow exerts a force on the cascade which tends to drive the movable cowl toward its closing position.

According to yet another form of the present disclosure, the leakage passage is delimited by a first rear face which extends radially and which belongs to the neutral blade and by a second front face which extends radially and which belongs to the blade of the last blading row.

The faces, namely the first rear face and the second front face, delimiting the leakage passage advantageously extend strictly radially. In other words, these faces are rectilinear, that is to say that they are free from obstacles which can disturb the flow of air perpendicular to the central axis of the rear assembly of the nacelle, or backward.

The radial or rectilinear nature of the faces delimiting the leakage passage is understood as faces in straight line, unlike curved faces.

Of course, the term "radial" means with respect to the central axis of the rear assembly of the nacelle.

According to at least one form of the present disclosure, the sliding cowl includes a front overhang which extends longitudinally so as to cap radially, at least in part, the leakage passage.

According to another form of the present disclosure, the sliding cowl carries flaps which are pivotally mounted in the cold air flow path, between a rest position and a thrust reversal position which corresponds to the opening position of the sliding cowl, the flaps being designed to direct the air flow toward the blading rows, from the first front blading row to the last rear blading row and to limit the flow rate of the air flow passing through the row of neutral blading 62, when the flaps 46 are in thrust reversal position.

The present disclosure also concerns an aircraft turbojet engine nacelle including a nacelle rear assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
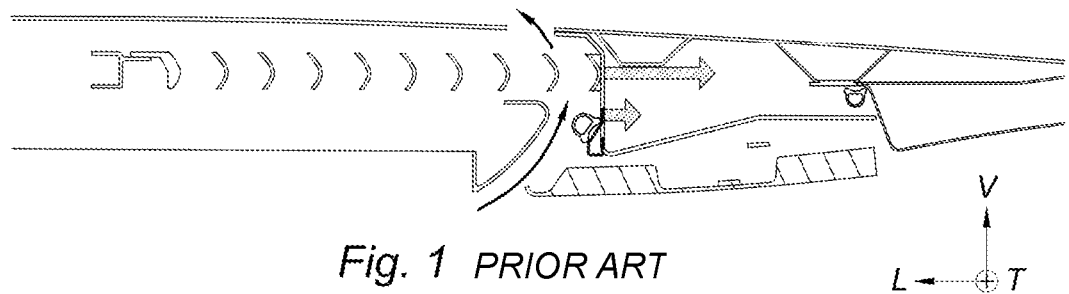
FIG. 1 is a schematic longitudinal sectional view illustrating a cascade vane of a thrust reverser, according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the longitudinal, vertical and transverse terminology will be adopted without limitation, with reference to the trihedron L, V, T indicated in the figures, whose axis L is parallel to the central axis A of the nacelle.

The terms "axial" and "radial" will also be used with reference to the longitudinal central axis (A) of the nacelle, the term "radial" designating a direction perpendicular to the central axis A of the nacelle.

In all these figures, identical or analogous references represent identical or analogous organs or sets of organs.

Figure 2:
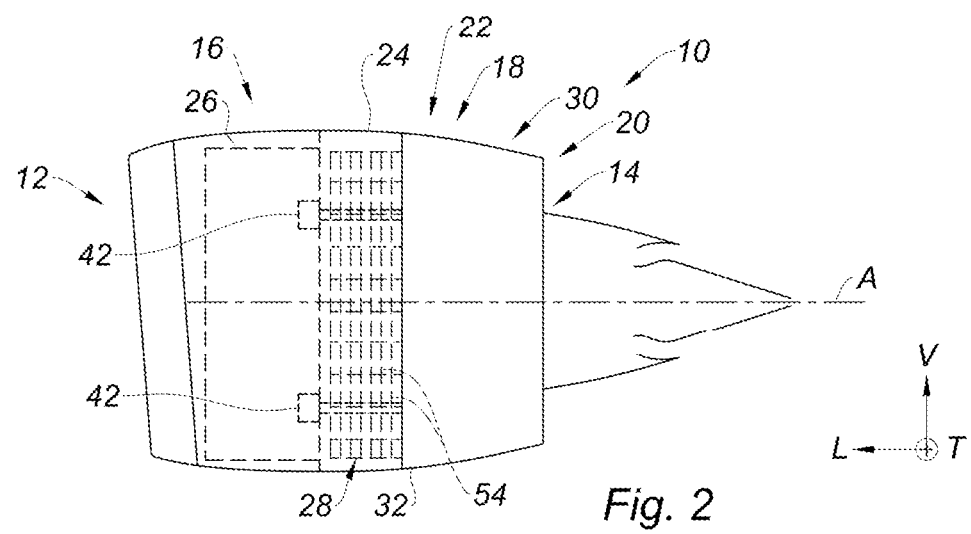
FIG. 2 is an overall schematic view illustrating a turbojet engine nacelle comprising a rear assembly of a nacelle equipped with a thrust reverser which comprises a substantially retracted sliding cowl, according to the present disclosure.

Note that in the present patent application, the terms "upstream" and "downstream" must be understood relative to the circulation of the air flow inside the propulsion unit formed by the nacelle and the turbojet engine, that is to say from the left toward the right in FIG. 2.

In the present application, the terms "upper," "lower" and their derivatives refer to the position or the orientation of an element or of a component, this position or this orientation being considered when the nacelle is in configuration of service on an aircraft on the ground.

FIG. 2 represents a nacelle 10 of a turbojet engine which has a substantially tubular structure about a longitudinal central axis (A).

The nacelle 10 comprises an air inlet 12 upstream from the turbojet engine 14, a median section 16 intended to surround a fan of the turbojet engine, a nacelle rear assembly 18 intended to surround the combustion chamber of the turbojet engine 14, the nacelle 10 being terminated by an ejection nozzle 20, whose outlet is located downstream of the turbojet engine 14.

Figure 4:
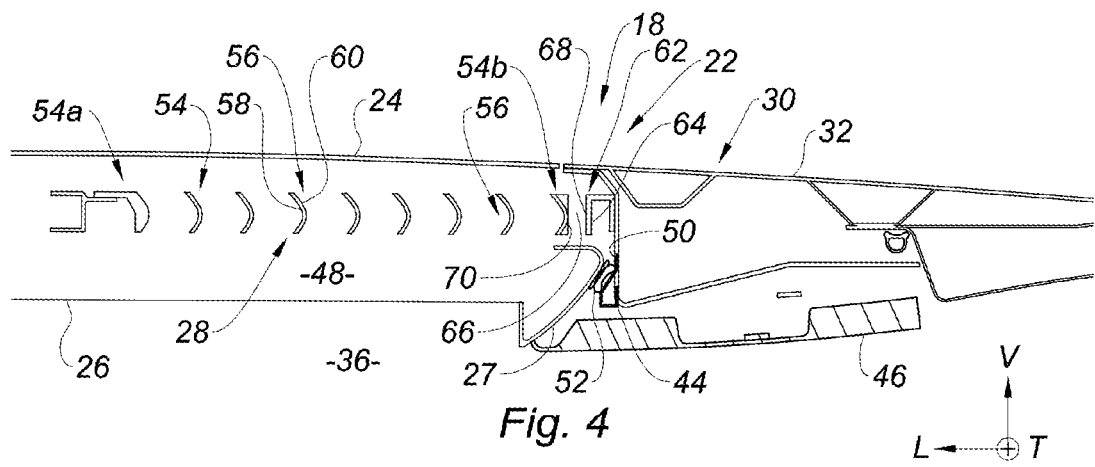
FIG. 4 is a longitudinal cross-sectional view illustrating the sliding cowl in the direct jet position, and a cascade vane with neutral blading, according to the present disclosure.
Figure 5:
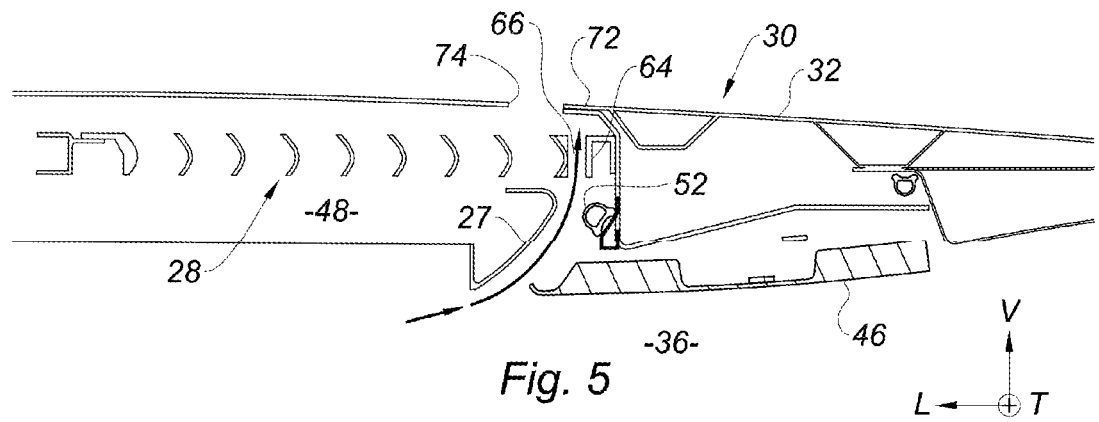
FIG. 5 is a longitudinal cross-sectional view illustrating the sliding cowl of FIG. 4 in the substantially retracted position.
Figure 6:
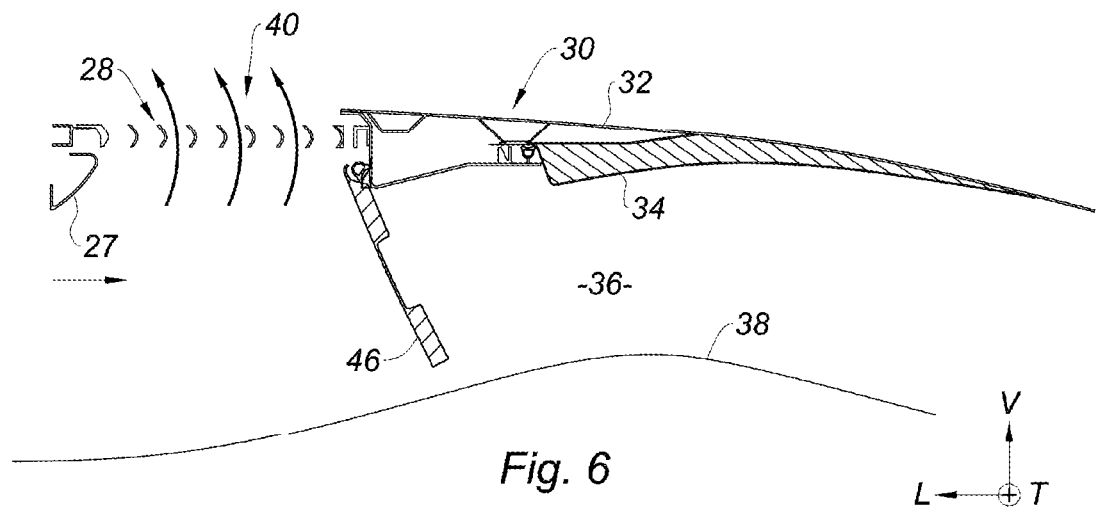
FIG. 6 is a longitudinal cross-sectional view illustrating the sliding cowl of FIG. 4 in the thrust reversal position.

The median section 16 includes an outer fan cowl 24 and a fan casing 26 which delimits a deflection edge 27 visible in FIGS. 4 to 6.

The nacelle rear assembly 18 of the nacelle 10 includes a thrust reverser 22 which supports cascade vanes 28.

The thrust reverser 22 includes a sliding thrust reversal cowl 30 which has a generally cylindrical shape about the axis A of the nacelle 10.

As can be seen in FIG. 6, the sliding cowl 30 comprises an outer cowl 32, and an inner wall 34 which delimits a cold air flow path 36 with an inner structure 38 which surrounds the turbojet engine 14.

The sliding thrust reversal cowl 30 is axially mounted movable in longitudinal translation from front to back, between a closing position illustrated in FIGS. 2 and 4, in which the sliding cowl 30 provides aerodynamic continuity of the nacelle 10, and an opening position illustrated in FIG. 6, in which the sliding cowl 30 opens a passage 40 for the redirection of an air flow coming from the cold air flow path 36 of the nacelle 10.

To this end, as can be seen in FIG. 2, the thrust reverser 22 comprises cylinders 42, which are designed to drive the assembly formed by the cascades 28 and the sliding thrust reversal cowl 30 in sliding between its opening position and its closing position.

Also, the cascades 28 are secured to a rear frame 44 which is connected to the sliding cowl 30, so that the cascades 28 are slidably driven with the sliding cowl 30 by the cylinders 42.

The sliding cowl 30 carries flaps 46 which are pivotally mounted in the cold air flow path 36, between a rest position illustrated in FIGS. 4 and 5, which corresponds to the direct jet closing position of the sliding cowl 30, and a thrust reversal position illustrated in FIG. 6, which corresponds to the thrust reversal opening position of the sliding cowl 30, in which the flaps 46 direct the air flow toward the cascades 28 as illustrated by the arrows in FIG. 6.

With reference to FIG. 4, it will be noted that when the sliding cowl 30 occupies its closing position, the cascades 28 are housed in a cavity 48 which is delimited radially by the outer fan cowl 24 and the fan casing 26.

In addition, a front portion 50 of the sliding cowl 30 is in longitudinal bearing on the deflection edge 27 of the fan casing 26 via a seal 52, to inhibit the air flowing in the cold air flow path 36 to enter the cavity 48 which houses the cascade vanes 28.

The cascade vanes 28 each comprise a plurality of blading rows 54 which each extend in a circular manner about the central axis A and which are arranged longitudinally in a regular manner from a first front blading row 54a to a last rear blading row 54b.

Each blading row 54 includes a plurality of blades 56 which are each adapted to divert the air flow coming from the cold air flow path 36 forward, outside the nacelle 10, so as to exert a counter-thrust.

As can be seen in FIG. 4, the blades 56 of the blading rows 54 have a curved shape and are each delimited by a concave front face 58 and by a convex rear face 60, to direct the air flow forward.

In accordance with the present disclosure, the cascade 28 includes an additional neutral blading row 62 which is interposed longitudinally between the last blading row 54b and the sliding cowl 30.

The neutral blading row 62 extends circularly about the central axis A and it includes a plurality of neutral blades 64.

In addition, the neutral blading row 62 delimits a leakage passage 66 toward the outside of the nacelle rear assembly 18 of the nacelle 10, the leakage passage 66 being designed so that the force exerted on each neutral blade 64 by the leakage air through the leakage passage 66 is devoid of an axial component oriented backward.

According to the form of the present disclosure described here, the leakage passage 66 is adapted to radially orient the leakage air, that is to say perpendicular to the central axis A of the nacelle rear assembly 18 of the nacelle 10.

To this end, the leakage passage 66 is delimited by a first rear face 68 which extends radially and which belongs to the neutral blade 64 and by a second front face 70 which extends radially and which belongs to the blade 56 of the last blading row 54b.

Figure 3:
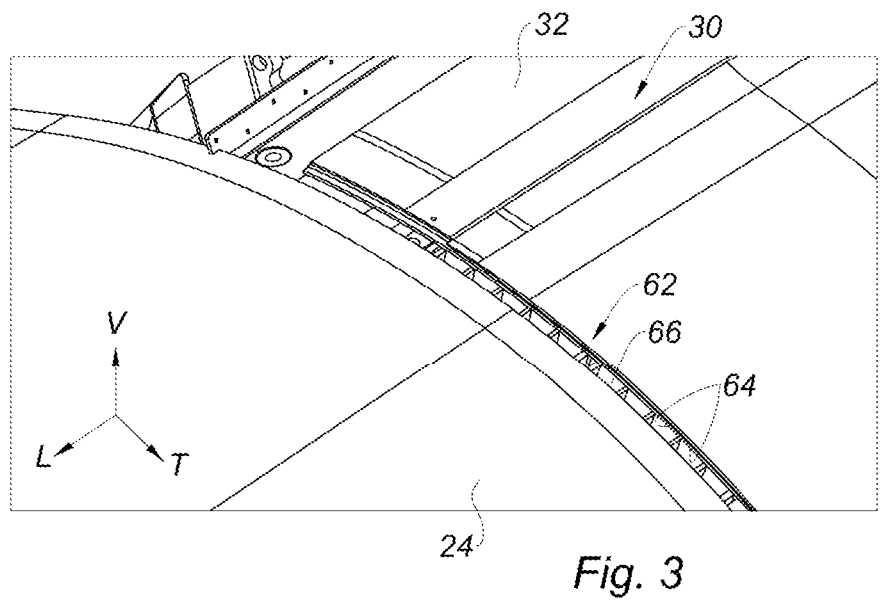
FIG. 3 is a detailed perspective view illustrating a clearance for the passage of an air leakage through the cascades of the thrust reverser of FIG. 2.

Thus, when the sliding cowl 30 adopts a substantially retracted position illustrated in FIGS. 3 and 5, for example in the case of non-functioning of the holding locks for holding the sliding cowl 30 in the closed position, a leakage air flow flows from the fresh air flow path 36, by passing successively between the deflection edge 27 and the front portion 50 of the sliding cowl 30, then through the leakage passage 66. In this configuration, the leakage air flow does not exert axial force backward due to its strictly radial orientation.

According to another aspect of the present disclosure illustrated in FIG. 5, the sliding cowl 30 includes a front overhang 72 which extends longitudinally so as to radially cap the leakage passage 66 and the neutral blade 64.

The front overhang 72 is arranged opposite a rear end edge 74 of the fan cowl 24, so as to provide aerodynamic continuity of the nacelle 10 in the closed sliding cowl 30 configuration.

The description of the present disclosure is given by way of non-limiting example.

It will be understood in particular that the leakage passage 66 can be adapted to orient the leakage air substantially backward, the leakage passage 66 then being designed so that the force exerted on each neutral blade 64 by the leakage air through the leakage passage 66 has an axial component oriented forward which tends to close the sliding cowl 30.

In this type of configuration in which the leakage passage 66 directs the leakage air substantially backward, the flaps 46 are designed to direct the air flow toward the blading rows 54 which redirect the air flow forward, to limit the flow rate of the air flow passing through the neutral blading row 62, when the flaps 46 are in thrust reversal position, as can be seen in FIG. 6.

To this end, the leading edge of each flap 46, which is arranged in the vicinity of the pivot point of the associated flap 46, is arranged substantially at the level of the last blading row 54b in a longitudinal direction.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle rear assembly of a nacelle of an aircraft turbojet engine, the nacelle rear assembly extending along a longitudinal central axis (A), and the nacelle rear assembly including a thrust reverser with sliding cascades, the nacelle rear assembly comprising:
    a sliding cowl axially mounted movable in longitudinal translation from front to back, between a closing position in which the sliding cowl provides aerodynamic continuity of the nacelle, and an opening position in which the sliding cowl opens a passage for directing an air flow coming from a cold air flow path of the nacelle; and
    a cascade of vanes comprising a plurality of blading rows each extending about the longitudinal central axis (A) and arranged longitudinally from a first front blading row to a last rear blading row, each blading row, except the last rear blading row, including at least one deflection blade having a curved shape and defined by a concave front face and a convex rear face to direct the air flow forward and toward an outside of the nacelle rear assembly of the nacelle, the cascade of vanes being secured in displacement to the sliding cowl,
    wherein the sliding cowl includes a front end and an overhang extending forwardly from the front end, the overhang of the sliding cowl provides aerodynamic continuity with the nacelle when the sliding cowl is in the closing position, the overhang and the front end defining a recessed portion, and
    wherein the cascade of vanes include at least one neutral blading row interposed between the last rear blading row and the front end of the sliding cowl and including at least one neutral blade disposed in the recessed portion and surrounded by the overhang, the at least one neutral blading row and the last rear blading row jointly delimiting a leakage passage toward the outside of the nacelle rear assembly and a force exerted on the at least one neutral blade by the air flow through the leakage passage is devoid of an axial component oriented backward.

2. The nacelle rear assembly according to claim 1, wherein the leakage passage is adapted to direct the air flow perpendicular to the longitudinal central axis (A) of the nacelle rear assembly.

3. The nacelle rear assembly according to claim 1, wherein the leakage passage is delimited by a first rear face which extends radially and which belongs to the at least one neutral blade and by a second front face which extends radially and which belongs to a blade of the last rear blading row.

4. The nacelle rear assembly according to claim 3, wherein the first rear face is parallel to the second front face.

5. The nacelle rear assembly according to claim 1, wherein the overhang extends longitudinally to radially cap, at least in part, the leakage passage.

6. The nacelle rear assembly according to claim 1, wherein the sliding cowl carries flaps pivotally mounted in the cold air flow path, between a rest position and a thrust reversal position corresponding to the opening position of the sliding cowl, the flaps configured to direct the air flow toward the blading rows, from the first front blading row to the last rear blading row and to limit a flow rate of the air flow passing through the neutral blading row, when the flaps are in the thrust reversal position.

7. A nacelle of an aircraft turbojet engine including a nacelle rear assembly according to claim 1.

8. The nacelle rear assembly according to claim 1, wherein the overhang includes a front end that is disposed upstream from the at least one neutral blading row.

9. The nacelle rear assembly according to claim 1, wherein the overhang includes a front end that is disposed upstream from the leakage passage.

10. The nacelle rear assembly according to claim 1, wherein the air flow through the leakage passage is first directed upstream toward a front end of the overhang and then outside the sliding cowl.

11. The nacelle rear assembly according to claim 1, wherein the plurality of blading rows and the at least one neutral blading row are disposed radially and inwardly from the overhang.

12. The nacelle rear assembly according to claim 1, wherein the overhang has a front end that is disposed upstream from the leakage passage defined between the last rear blading row and the at least one neutral blading row.

13. The nacelle rear assembly according to claim 1, wherein the sliding cowl further includes a flap, when the sliding cowl is in the closing position, the flap abuts against a deflection edge of a fan casing to inhibit the air flow coming from the cold air flow path from entering a cavity that houses the cascade of vanes.

14. The nacelle rear assembly according to claim 13, wherein when the sliding cowl is in a substantially retracted position, a gap is defined between the flap and the deflection edge and the air flow coming from the cold air flow path flows through the gap between the flap and the deflection edge, and then through the leakage passage toward the outside of the nacelle rear assembly.

* * * * *